(12) United States Patent
Seymour et al.

(10) Patent No.: US 6,212,470 B1
(45) Date of Patent: Apr. 3, 2001

(54) DRIVER PREFERENCE RESPONSIVE VEHICLE ROUTE GUIDANCE SYSTEM

(75) Inventors: Leslie G. Seymour, Barrington; Michael Barnea; Allan Kirson, both of Highland Park, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/255,128

(22) Filed: Jun. 7, 1994

Related U.S. Application Data

(63) Continuation of application No. 07/786,450, filed on Nov. 1, 1991, now abandoned.

(51) Int. Cl.[7] ................................................ G06F 165/00
(52) U.S. Cl. ........................ 701/207; 701/201; 706/900; 706/913; 340/988; 340/990; 340/995
(58) Field of Search ..................................... 364/444, 449; 340/988, 990, 995; 395/908, 913; 701/201, 207; 706/900, 913

(56) References Cited

U.S. PATENT DOCUMENTS

| 4,733,356 | 3/1988 | Haeussermann et al. | ....... 364/443 X |
| 4,937,751 | 6/1990 | Nimura et al. | ....................... 364/449 |

OTHER PUBLICATIONS

Fuzzy Logic Simplifies Complex Control Problems, Tom Williams, Computer Design, Mar. 1, 1991, pp. 90–102.
Knowledge Representation in Fuzzy Logic, Lotfi A. Zadeh, IEEE Transaction on Knowledge and Data Engineering, vol. 1, No. 1, Mar. 1989.
Fuzzy Systems and Applications, United Signals and Systems Inc., Bart Kosko with Fred Watkins, Jun. 5–7, 1991, p. 18.
Prototype for a Land Based Automatic Vehicle Location and Navigation System, a Thesis by Clyde B. Harris, submitted to the Department of Surveying Engineering, Calgary, Alberta, Dec. 1989.

Primary Examiner—Vincent N. Trans
Assistant Examiner—Hugh Jones
(74) Attorney, Agent, or Firm—Nick Hopman

(57) ABSTRACT

A vehicle route guidance system considers driver preferences, vehicle parameters such as speed and performance capabilities in a navigation computer, and outputs flexible guidance instructions based on these considerations. The system monitors vehicle parameters such as current location and speed with sensors such as an odometer (109), a compass (115), and a GPS receiver (113). The system also determines the location of a vehicle maneuver and then, considering the former attributes with a model free mechanism, in this case a navigation computer with fuzzy inferencing (101), communicates to the driver instructing him how to manoeuver.

6 Claims, 3 Drawing Sheets

DRIVER PREFERENCE RESPONSIVE VEHICLE ROUTE GUIDANCE SYSTEM

This is a continuation of application Ser. No. 07/786,450, filed Nov. 1, 1991 and now abandoned.

FIELD OF THE INVENTION

This invention is generally directed to the field of navigation, and more particularly to route guidance for vehicles. The present invention is related to U. S. patent application Ser. No. 07-786,867 A VEHICLE ROUTE PLANNING SYSTEM, Seymour et. al. and to U. S. patent application Ser. No. 07/786,500 AN IMPROVED ACCURACY SENSORY SYSTEM FOR VEHICLE NAVIGATION, Seymour et. al., both of which were filed on the same date herewith and are assigned to the assignee of the present invention.

BACKGROUND OF THE INVENTION

Modern vehicular navigation systems combine sensors, a map database, an interactive display, and dead-reckoning navigation schemes with various route planning and guidance schemes in order to route the driver from his present location to a desired destination location while providing guidance cues along as required. The problem with current technology is that it doesn't take into account driver preferences, vehicle parameters such as speed and/or performance capabilities, or outputting flexible guidance instructions based on these considerations. While some drivers want plenty of warning before an expected maneuver, some don't want to be bothered until necessary. As some drivers drive more aggressively, or have a high performance suspension they may want to approach the location of a maneuver faster, requiring an earlier guidance instruction.

SUMMARY OF THE INVENTION

A vehicle route guidance system includes a vehicle location sensor and an anticipated vehicle manoeuvre location determiner. A comparator compares the vehicle location and the anticipated vehicle maneuver location and generates a distance difference. The distance difference is coupled to a model free guidance instruction determiner, and the determined guidance instruction is then communicated to the vehicle operator.

BRIEF DESCRIPTION OF THE DRAWINGS

The present invention will be effectively comprehended when read with the aid of the accompanying drawings in which.

DETAILED DESCRIPTION OF A PREFERRED EMBODIMENT

The preferred embodiment shows a route guidance system considering driver preferences, vehicle parameters such as speed and performance capabilities, and outputting flexible guidance instructions based on these considerations. This system employs a navigation computer with a model free mechanism, in this case a fuzzy inferencing engine. Of course, it would be obvious to one with ordinary skill in the art to substitute another model free means such as a neural network, genetic learning method, or other model derivable from observations directly rather than by analytical methods. A model free means, as it applies here, is a technique for estimating input-output functions, or stimulus-response associations based on a non-analytic means.

The preferred embodiment applies fuzzy inferencing, based on fuzzy sets, as described by Lotfi Zadah in his landmark treatise "Fuzzy Sets", published in Information and Control, Vol. 8, pages 338–353, by the Academic Press, 1965.

Figure 1:
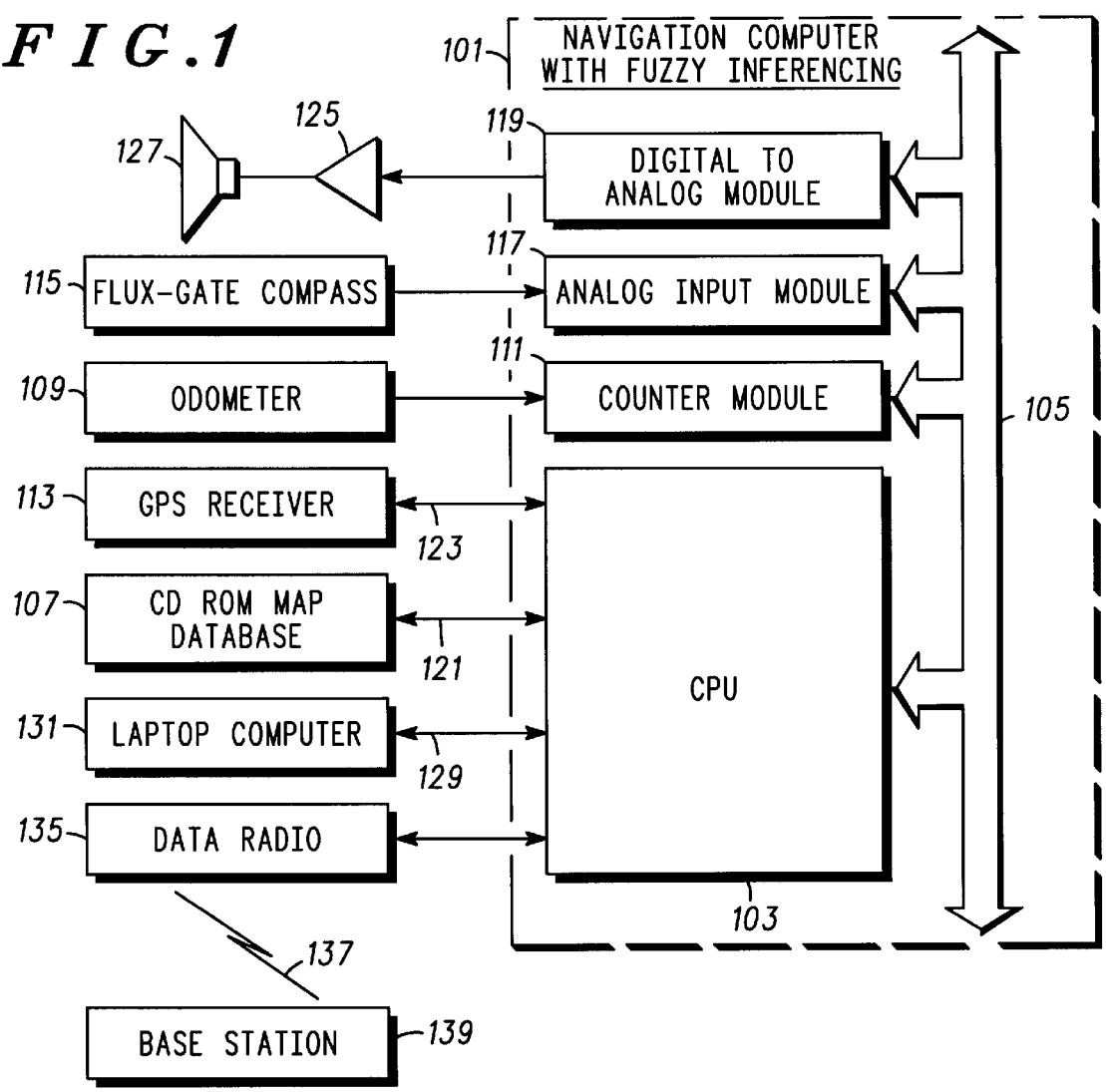
FIG. 1 illustrates a block diagram of a navigation computer with fuzzy inferencing providing a physical platform, as described in a preferred embodiment.

In the preferred embodiment, we describe a system for application in vehicle navigation applying a navigation computer with fuzzy inferencing capability. Referring to FIG. 1 we illustrate a physical platform for the navigation computer with fuzzy inferencing 101, by applying a MVME147SA-2 VME computer board, available from Motorola Inc., Microcomputer Division Marketing Department, MS DW283, 2900 South Diablo Way, Tempe, Ariz. 850282. This single board computer, or CPU 103 has a 32 Mhz 68030 with a 68882 floating point coprocessor, 32 Mb of DRAM, and a battery backed real time clock calendar. A VME bus 105 is a conduit applied to couple various other functions to the CPU 103. Other microprocessor types and platforms are suitable for this task as well.

We couple the SCSI bus interface 121 from the CPU 103 to the CDROM 107, a CDU541 available from Sony, Computer Peripheral Products Company, Sony Corporation of America 12337 Jones Road Suite 200-17 Houston, Tex. 77070. The CDROM 107 reads a digital map stored on an optical disk.

We then couple an odometer 109, in this case a digital position sensor, available from Honeywell's MICRO SWITCH division in Freeport, Ill. One of these sensors is mounted on each of 2 non-powered wheels and coupled to a XVME-203 Counter Module 111 available from XYCOM Inc. 750 North Maple Road, Saline, Mich. 48176, connected to the CPU 103 by the VME bus 105. This Counter Module 111 captures the odometer pulses. The odometer 109 outputs pulses as the tires rotate, indicating distance traversed by the respective wheels.

A GPS receiver 113, the EAGLE VIII, available from Motorola Inc. Government Electronics Group, Scottsdale, Ariz. 85252, is coupled to the CPU 103 through an RS-232C port 123. The GPS receiver 113 provides vehicle position information.

A flux-gate compass 115, providing heading information, is coupled to a XVME-500 Analog Input Module 117 available from XYCOM Inc. 750 North Maple Road, Saline, Mich. 48176, that is connected to the CPU 103 by the VME bus 105. The flux-gate compass 115, is available from Etak Inc., 1430 O'Brien Drive, Menlo Park, Calif. 94025.

A portable PC, or laptop computer 131 is coupled to the CPU 103 through an RS-232C port, 129. This laptop computer 131 is applied to receive input from the vehicle operator, or driver, and display relevant navigation information. An Apple Macintosh PC, available from Apple Computer Inc., 20525 Mariani Avenue, Cupertino, Calif. 95014 is applied.

The CPU 103 runs the compiled inferencing software developed on an IBM PC host computer using software available from Togai Infralogic, Inc. 30 Corporate Park, Suite 107 Irvine, Calif. 92714. This software is titled the Fuzzy C development system. Once the fuzzy sets, defined by membership functions, and fuzzy rules are derived using the IBM PC host, the output of the Fuzzy C development system is a standard ANSI C source code. This source code is then compiled by using the M68NNTBGHC SYSTEM V/68 GREEN HILLS C-68000 Compiler, available from Motorola Inc., Microcomputer Division Marketing Department, MS DW283, 2900 South Diablo Way, Tempe, Ariz. 850282. The output of the compiler is then loaded onto the CPU 103 for application execution. Of course, other embedded software emulations can be used. Alternative fuzzy inferencing system platforms include fuzzy microcontroller circuits, fuzzy coprocessors, analog computational circuits, digital computer circuits, optical computers, spatial light modulators and holograms to name a few.

Figure 2:
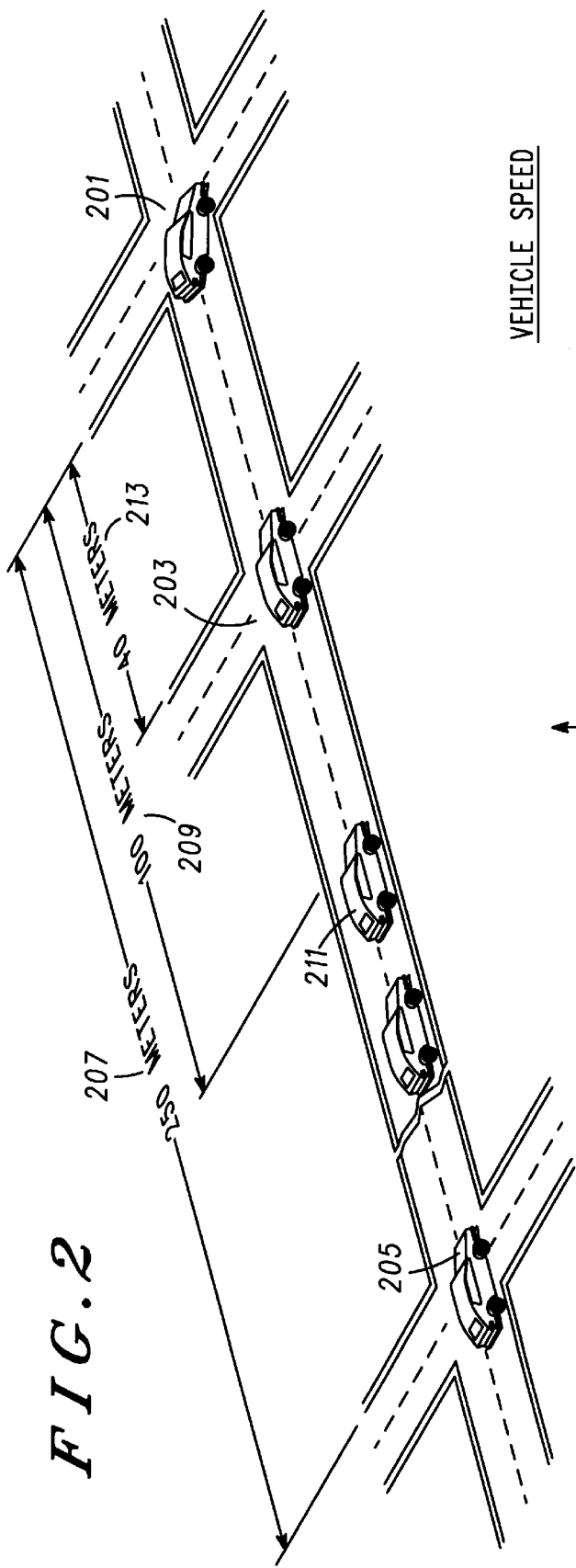
FIG. 2 illustrates a street map as described in a preferred embodiment.

Referring to FIG. 2 we illustrate a route guidance scenario. 201 represents the location of the desired manoeuvre. 203 represents a location very near the location of the desired manoeuvre 201. And 205 illustrates the initial position of the vehicle. The scenario we will examine illustrates the guidance instructions as the vehicle traverses from its location denoted by 205 towards the location of the desired manoeuvre 201.

The vehicle location is determined by the flux-gate compass 115, the odometer 109, the GPS receiver 123. The speed of the vehicle is determined by the odometer 109. Of course, it would be obvious to one of ordinary skill in the art that other sensor arrangements can provide vehicle location and vehicle speed information. The location of a desired manoeuvre is provided by the route planning mechanism in the navigation computer with fuzzy inferencing 101. For illustration of the preferred embodiment, the particulars of the route planner are unimportant. A route planning mechanism, such as described in aforementioned U. S. patent application Ser. No. 07-786,867 A VEHICLE ROUTE PLANNING SYSTEM, Seymour et. al., filed on the same date herewith, assigned to Motorola, provides the location of vehicle manoeuvres from the CDROM 107 map database. The driver inputs information into the laptop computer 131 stating trip origin location, trip destination location.

The navigation computer with fuzzy inferencing 101 begins the vehicle route guidance task by sensing the current vehicle location, determining the location of a manoeuvre from the route planner, and generating a difference distance by comparing these two locations. Based on the result of the comparison, the navigation computer with fuzzy inferencing 101 will issue a guidance instruction to the vehicle driver. This instruction will be issued through a voice command generated by the CPU 103 output on the VME bus 105 to the digital to analog module 119, through the amplifier 125, the speaker 127, and delivered to the driver of the vehicle. Of course, alternative embodiments can include a visual display for the guidance instructions through the use of the laptop computer 131 display, or other display mechanisms.

Figure 3:
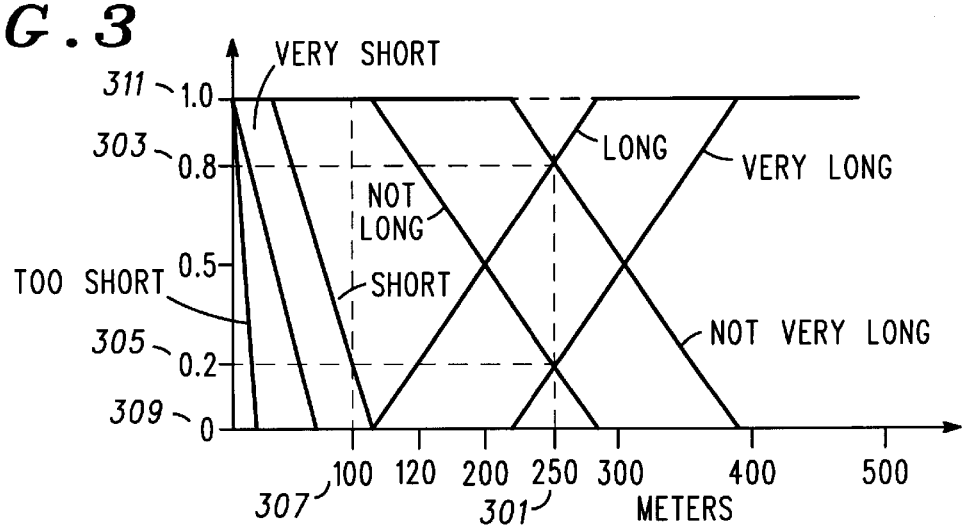
FIG. 3 illustrates a fuzzy set describing Distance To Intersection, as described in a preferred embodiment.
Figure 4:
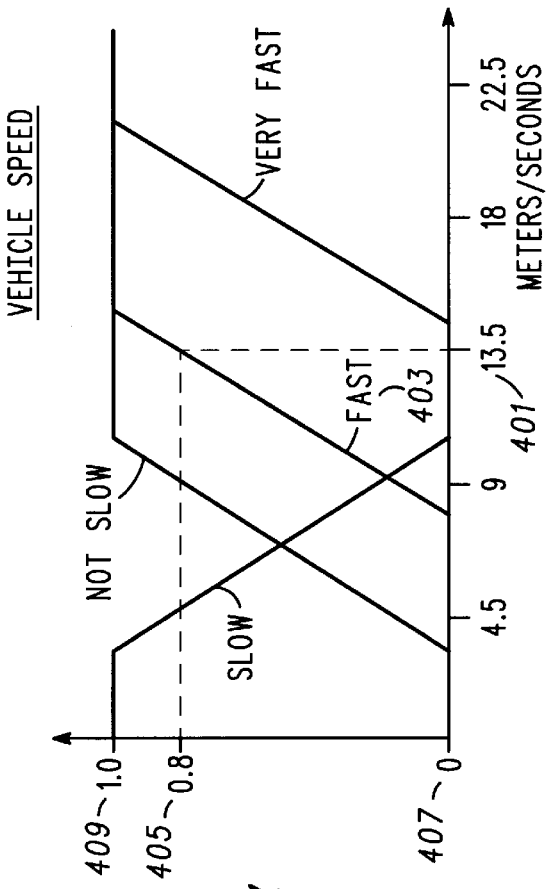
FIG. 4 illustrates a fuzzy set describing Vehicle Speed, as described in a preferred embodiment.

Considering the initial location of the vehicle 205 and the desired location of the manoeuvre 201 the navigation computer with fuzzy inferencing 101 generates a distance difference of 250 meters. Referring to FIG. 3, 250 meters 301 intersects with the Long and the Not Very Long fuzzy sets yielding a truth value of 0.8 303, and also the Very Long and Not Long sets with the truth value of 0.2 305, and with the Short, Very Short, and Too Short sets with a truth value of zero, 309. The other factor we consider is the vehicle speed. The vehicle is traveling at 13.5 meters per second. Referring to FIG. 4 we find that 13.5 meters per second 401 intersects with the Fast fuzzy set 403 with the truth value of 0.8 405, the Very Fast fuzzy set with a truth value of zero 407, with the Not Slow fuzzy set with a truth value of 1.0 409, and the Slow fuzzy set with a truth value of zero, 407.

The convenience of timing of the route guidance instructions can be significantly enhanced by using membership functions of time, such as Too Early, Too Late and the Right time. With the aid of TABLE 1, which shows a descriptive form of the fuzzy rule set, we can further understand which fuzzy recognition rules are selectable and consequently which fuzzy rules apply for selecting an action. For example, the following rule set derives a truth value for a Not Too Early For Warning, and Getting Too Late For Instruction Announcement conditions.

Note that items Capitalized are membership functions representing fuzzy sets and the items in UPPERCASE are formal linguistic operators for describing rules.

TABLE 1

A. IF the distance to the intersection IS Short
   AND IF the vehicle speed IS Not Slow
   THEN time IS Not Too Early For Warning
B. IF the distance to the intersection IS Not Long
   AND IF the vehicle speed IS Fast
   THEN time IS Not Too Early For Warning
C. IF the distance to the intersection IS Not Very long
   AND IF the vehicle speed IS Very Fast
   THEN time IS Not Too Early For Warning
D. IF the distance to the intersection IS Very Short
   AND IF the vehicle speed IS Not Slow
   THEN time IS getting too late for instruction announcement
E. IF the distance to the intersection IS Short
   AND IF the vehicle speed IS Fast
   THEN time IS Getting Too Late For Instruction Announcement
F. IF the distance to the intersection IS Not Long
   AND IF the vehicle speed IS Very Fast
   THEN time IS Getting Too Late For Instruction Announcement

TABLE 2

G. IF the time to reach the manoeuvre intersection IS
   Not Too Early For Warning
     AND IF no other intersection IS in between
   THEN the time IS Right For Preparation Warning Announcement
H. IF the time to reach the manoeuvre intersection IS
   Not Too Early For Warning
     AND IF there IS another intersection in between
   THEN the time IS Right For Instruction Announcement
I. IF the time to reach the manoeuvre intersection IS
   Not Too Early For Warning
     AND IF a preparation warning has been announced
     AND IF the last in-between intersection
       has been passed
   THEN the time IS Right For Instruction Announcement
J. IF the time to reach the manoeuvre intersection IS
   Not Too Early For Warning
     AND IF there IS another intersection in between
       AND IF a preparation warning has been announced
         AND IF it IS Getting Too Late For Instruction Announcement TABLE 2-continued THEN the time IS Right For Instruction Announcement
with Warning of Additional Intersections Notice that the consequence, or "THEN", clauses in the rules found in TABLE 1 are antecedent to the recognition, or "IF", causes in TABLE 2. For instance, the consequence clause of Rule A in TABLE 1 develops a truth value for Not Too Early For Warning that is consequently recognized by Rule G in TABLE 2.

Figure 5:
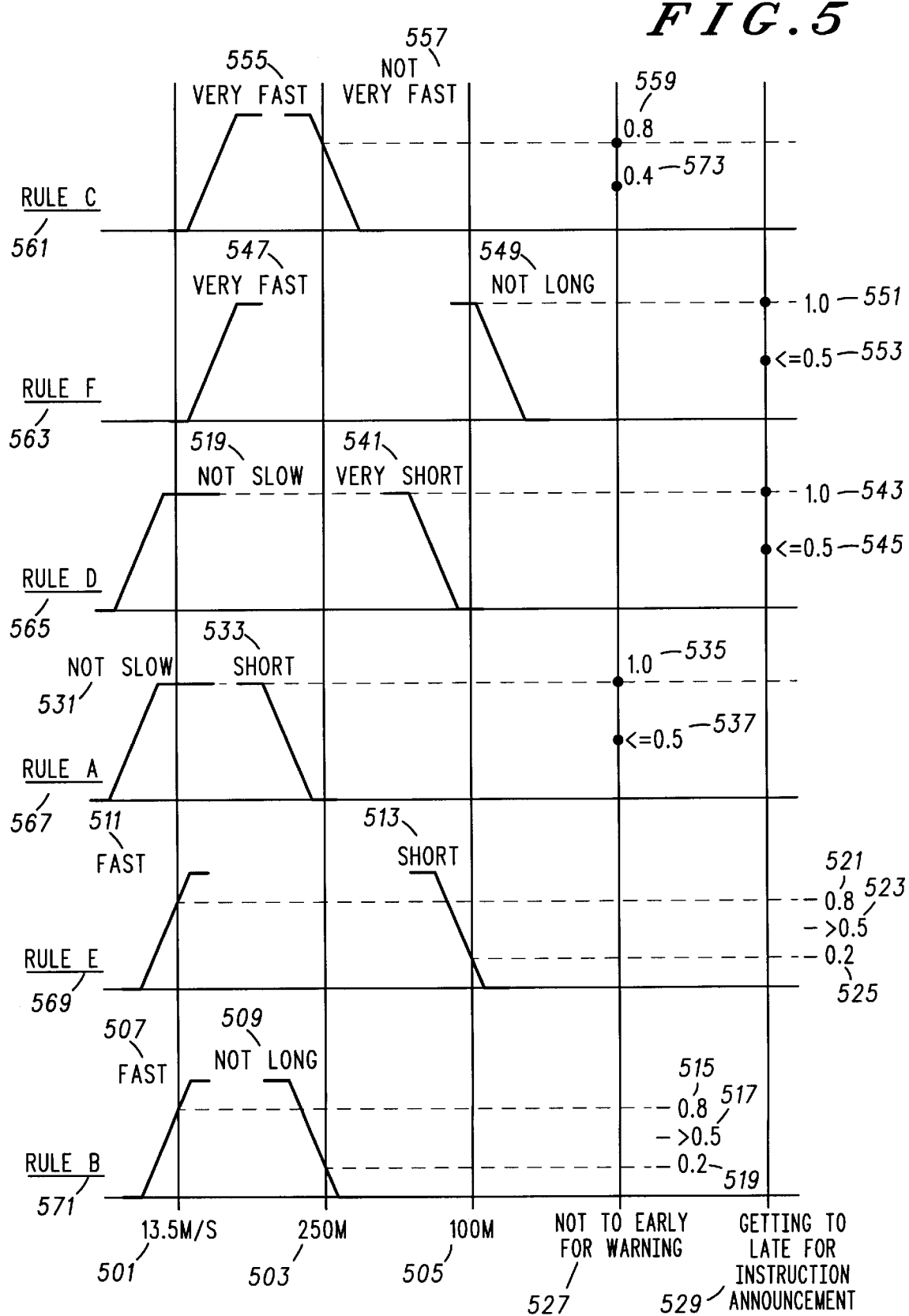
FIG. 5 illustrates a set of fuzzy rules and fuzzy sets in graphical format, as described in a preferred embodiment.

FIG. 5 illustrates graphically which rules are selected in our example, showing the intersection of the fuzzy variables of vehicle speed and distance difference, with the truth values of the fuzzy sets. To illustrate the route guidance mechanism we will look at the conclusions Not Too Early For Warning 527 and Getting Too Late For Instruction Announcement 529. With the vehicle at the initial location 205 250 meters 503 from the desired location of the manoeuvre 201 traveling at 13.5 meters per second 501, Rule B 571 is selected.

The appropriate choice for the fuzzy AND operator is the average of the two antecedent membership values, the speed and the distance. The defuzzification threshold for the fuzzy consequence truth value will be 0.5 which has to be exceeded in order to consider the consequent condition activated. Since in Rule B 571 the speed is constant, and at the same time the distance to the location of the desired manoeuvre 201 is getting shorter, this 0.5 threshold value will be immediately exceeded after this truth value is reached. As the average of the two truth values 515 and 519 exceeds 0.5 517 we indicate that it is Not Too Early For Warning. This condition will trigger Rule H and its consequent condition The Time is Right For Preparation Warning. A guidance instruction of "prepare for right turn" is issued at this point. The rationale behind this particular message is that while traveling at 13.5 meters per second the driver is usually informed a manoeuvre instruction at this point. The vehicle was going too fast to wait to announce the turn after the location 203 very near the location of the desired manoeuvre 201. We assume for this example that the driver does not slow the vehicle speed.

As the vehicle approaches the location 211 100 meters 505 from the desired manoeuvre location 201 the average of the truth values 0.8 521 and 0.2 525 resulting from Rule E 569 builds to a value greater than 0.5 523 initiating the Getting Too Late For Instruction Announcement 529. In turn this condition will trigger Rule J and a guidance instruction of "turn right at the second intersection" is issued at this point.

Of course, given the teaching here, it would be obvious to one of ordinary skill in the art to consider the difficulty, or the degree, of the manoeuvre and change the timing of communication to warn at an earlier time based on the difficulty, or degree, of the manoeuvre. An example of this is a 135 degree right turn, rather than a more typical 90 degree turn.

Of course, given the teaching here, it would also be obvious to consider the defuzzification threshold of the consequent truth values being dependant on the accident risk limitations or stress limitations imposed on the driver. These dependencies could be determined as membership functions. For instance a lower stress limit for the driver would imply a lower threshold value for the Getting Too Late for Instruction truth value.

Of course, given the teaching here, specific vehicle personality, or dynamic performance, and or other human, or driver, preferences can also be considered. These attributes can be entered into the laptop computer 131 as truth values. When classified by the navigation computer with fuzzy inferencing, 101 they can select rule sets designed to take full advantage of the driver's intent.

In conclusion, we have illustrated a route guidance system considering driver preferences, vehicle parameters such as speed and performance capabilities, and outputting flexible guidance instructions based on these considerations.

What is claimed is:

1. A vehicle route guidance system comprising:
   means for sensing vehicle location;
   means for determining a location of an anticipated vehicle manoeuvre;
   means for comparing said sensed vehicle location and said determined location and generating a distance difference corresponding to a difference between the vehicle location and the location of the anticipated vehicle manoeuvre;
   means for providing driver instruction timing preferences in accordance with the generated distance difference, wherein the driver instruction timing preferences are comprised of a plurality of continuous functions;
   means, responsive to said generated distance difference, for determining a degree of conformance to the driver instruction timing preferences, and for generating a guidance instruction whose timing is determined by the degree of conformance to the driver instruction timing preferences; and
   means for communicating said guidance instruction to a driver of the vehicle.

2. A vehicle route guidance system in accordance with claim 1 wherein each of the plurality of continuous functions represent driver instruction timing preferences as a function of the distance difference.

3. A vehicle route guidance system in accordance with claim 2 wherein each of the plurality of continuous functions represent driver instruction timing preferences as a function of the vehicle speed.

4. A vehicle route guidance system in accordance with claim 2 wherein the means for determining a degree of conformance to the driver instruction timing preferences comprise fuzzy inferencing means, and wherein the plurality of continuous functions representing driver instruction timing preferences are used to select a predetermined rule set for generating the guidance instruction.

5. A route guidance system for a vehicle, the system comprising:
   means for determining a location of the vehicle;
   means for determining a speed of the vehicle;
   means for determining a location of an anticipated manoeuvre of the vehicle;
   means for generating a distance difference corresponding to a difference between the location of the vehicle and the location of the anticipated manoeuvre of the vehicle;

first means for driver preference matching for providing a distance attribute and a speed attribute dependent on the distance difference and the determined speed of the vehicle respectively;

second means for driver preference matching for providing a manoeuvre announcement timing preference score dependent on both of the provided speed and distance attributes; and means for generating a guidance instruction, the timing determined dependent on the manoeuvre announcement timing preference score.

6. The system in accordance with claim 5 further comprising:

map means, dependent on the determined location of the vehicle, for identifying a location of an intersecting road that the vehicle will pass in order to arrive at the location of the anticipated manoeuvre of the vehicle;

means for determining an estimated vehicle location positioned before the intersecting road;

third means for driver preference matching for providing an additional manoeuvre announcement timing preference score from the manoeuvre announcement timing preference score, the identified location of the intersecting road, and the estimated vehicle location; and means for generating a warning guidance instruction whose timing is determined dependent on the additional manoeuvre announcement timing preference score.

* * * * *